United States Patent
Murayama et al.

(10) Patent No.: US 11,940,326 B2
(45) Date of Patent: Mar. 26, 2024

(54) SPECTROSCOPIC ANALYSIS DEVICE, OPTICAL SYSTEM, AND METHOD

(71) Applicant: YOKOGAWA ELECTRIC CORPORATION, Tokyo (JP)

(72) Inventors: Kodai Murayama, Tokyo (JP); Toshiyuki Saruya, Tokyo (JP); Fumie Watanabe, Tokyo (JP); Risa Hara, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 191 days.

(21) Appl. No.: 17/406,653

(22) Filed: Aug. 19, 2021

(65) Prior Publication Data

US 2022/0065697 A1 Mar. 3, 2022

(30) Foreign Application Priority Data

Aug. 26, 2020 (JP) ................................. 2020-142851

(51) Int. Cl.
| | |
|---|---|
| *G01J 3/42* | (2006.01) |
| *G01J 3/02* | (2006.01) |
| *G01N 21/31* | (2006.01) |
| *G01N 21/359* | (2014.01) |

(52) U.S. Cl.
CPC .............. *G01J 3/42* (2013.01); *G01J 3/0218* (2013.01); *G01N 21/359* (2013.01); *G01N 2021/3155* (2013.01)

(58) Field of Classification Search
CPC ........ G01J 3/42; G01J 3/0218; G01N 21/359; G01N 2021/3155; G01N 21/85; G01N 21/553; G01N 21/15; G01N 21/31

USPC .......................................................... 356/432
See application file for complete search history.

(56) References Cited

U.S. PATENT DOCUMENTS

| | | | |
|---|---|---|---|
| 2006/0131289 A1* | 6/2006 | Jyumonji | B23K 26/0853 |
| | | | 219/121.65 |
| 2009/0087924 A1 | 4/2009 | Bynum et al. | |
| 2010/0128273 A1 | 5/2010 | Lee et al. | |

FOREIGN PATENT DOCUMENTS

| | | | | |
|---|---|---|---|---|
| CN | 103376244 B | | 9/2016 | |
| JP | 2005077245 A | | 3/2005 | |
| JP | 2009128012 A | | 6/2009 | |
| JP | 2012063321 A | * | 3/2012 | ............. G01B 11/06 |

(Continued)

OTHER PUBLICATIONS

Ichiro Tanabe et al., "Development of Far- and Deep-Ultraviolet Surface Plasmon Resonance (SPR) Sensor Using Aluminum Thin Film", Proceedings of Spie, vol. 9926; Sep. 15, 2016 (6 pages).

(Continued)

*Primary Examiner* — Md M Rahman
(74) *Attorney, Agent, or Firm* — Osha Bergman Watanabe & Burton LLP (57) ABSTRACT

A spectroscopic analysis device includes: a film that contacts a sample subject to spectroscopic analysis; a first irradiator that irradiates a first irradiation light having transition energy to decompose attached material attached to a boundary surface of the film; and an optical waveguide that transmits the first irradiation light irradiated from the first irradiator. A first evanescent wave, based on the first irradiation light, is generated on a front surface of the optical waveguide, and is then projected on an attached region of the attached material.

9 Claims, 6 Drawing Sheets

(56) References Cited

FOREIGN PATENT DOCUMENTS

JP          2014035311 A      2/2014

OTHER PUBLICATIONS

Ichiro Tanabe et. al., "Far- and Deep-Ultraviolet Surface Plasmon Resonance Using AI film for Efficient Sensing of Organic Thin Overlayer"; Sensors and Actuators A: Phisycal, Elsevier BV, vol. 301, pp. 1-6; Nov. 9, 2019 (6 pages).
Iketada et al, "High sensitive detection of near-infrared absorption by surface plasmon resonance", Appl. Phys. Lett. 83, 2232 (2003), Published Sep. 9, 2003 (4 pages).

* cited by examiner

SPECTROSCOPIC ANALYSIS DEVICE, OPTICAL SYSTEM, AND METHOD

BACKGROUND

Technical Field

The present invention generally relates to a spectroscopic analysis device, an optical system, and a method.

Related Art

Conventionally, art is known for analyzing the state of a sample including a solution or the like based on a spectroscopic method.

For example, non-patent literature 1 discloses a surface plasmon resonance near infrared spectroscopy method wherein free electrons in metal are excited and made to resonate using light, a resonance spectrum of surface plasmon and an absorption spectrum of a sample are overlapped, and the intensity of the absorption spectrum of the sample is seemingly increased.

Non-Patent Literature
Non-Patent Literature 1: Appl. Phys. Lett. 83, 2232 (2003); https://doi.org/10.1063/1.1610812

In such conventional art, when an attached material attaches to a boundary surface of a metal thin film that the sample subject to spectroscopic analysis comes into contact with, only spectroscopic information based on the attached material can be obtained. To improve the technologies in obtaining the spectroscopic information, the attached material on the boundary is removed by performing a cleaning treatment including wiping, cleaning using a surfactant, and surface polishing or the like. However, it is not possible to continuously perform measurement of the sample using spectroscopic analysis due to such a cleaning treatment, causing decreased measurement efficiency.

SUMMARY

One or more embodiments provide a spectroscopic analysis device, optical system, and method wherein measurement efficiency of a sample using spectroscopic analysis is improved.

The spectroscopic analysis device according to one or more embodiments includes a film on which a sample subject to spectroscopic analysis contacts, a first irradiation unit for irradiating a first irradiation light having transition energy wherein attached material attached to a boundary surface of the film decomposes, and an optical waveguide for transmitting the first irradiation light irradiated from the first irradiation unit, wherein: on a front surface of the optical waveguide, a first evanescent wave is generated, being based on the first irradiation light, and the first evanescent wave is then projected on an attached region of the attached material.

Thus efficiency in measuring a sample using spectroscopic analysis improves using the spectroscopic analysis device. For example, the spectroscopic analysis device can decompose the attached material attached to the boundary surface of the metal thin film by a first evanescent wave being generated on the front surface of the optical waveguide; the evanescent wave being based on the first irradiation light, and the evanescent wave is then projected on the attached region of the attached material. For example, the spectroscopic analysis device can decompose and separate high polymer organic substances such as proteins that have adhered or accumulated on the boundary surface of the metal thin film. The decomposed attached material is washed away by the flow of the sample contacting the metal thin film. According to the above, the spectroscopic analysis device can omit the cleaning treatment including wiping, cleaning using a surfactant, and surface polishing or the like, which was required in the conventional art. The spectroscopic analysis device can thereby continuously perform measurement of the sample using spectroscopic analysis.

In the spectroscopic analysis device according to one or more embodiments, the optical waveguide may have a reflective surface for completely reflecting so that the first irradiation light incident on the optical waveguide is transmitted while being completely reflected in the optical waveguide. Thus, the incidence of the first irradiation light transmitted in the optical waveguide on the exterior of the optical waveguide, for example, the prism, can be suppressed. As a result, for example, the contamination of the first irradiation light in the optical path relating to the second detection unit is suppressed, and crosstalk of the first irradiation light is suppressed. Therefore, noise based on the first irradiation light is reduced when performing optical measurement of the sample using the second detection unit. Additionally, for example, deterioration of the prism due to solarization or the like based on the first irradiation light is suppressed. Similarly, for example, deterioration based on the first irradiation light on the antireflective film with respect to the second irradiation light formed on the front surface on the optical waveguide side on the prism is suppressed.

The spectroscopic analysis device according to one or more embodiments may be provided with a first detection unit that detects first measured light emitted from the optical waveguide based on the first irradiation light irradiated by the first irradiation unit; the first measured light including first information of an absorption spectrum of the attached material. Thus, the spectroscopic analysis device can identify changes in the absorption spectrum. Therefore, the spectroscopic analysis device detects the attaching of the attached material based on changes in the absorption spectrum and can perform a treatment for decomposing the attached material based on the first irradiation light at the appropriate timing. Additionally, the spectroscopic analysis device can easily detect whether decomposition of the attached material by the first irradiation light has been surely achieved based on changes in the absorption spectrum.

The spectroscopic analysis device according to one or more embodiments may be provided with a control unit for obtaining the first information from the first detection unit, wherein the control unit determines whether a peak of the absorption spectrum has reached a threshold value relating to spectrum intensity based on the acquired first information, and when it is determined that the threshold value has been reached, changes the irradiation intensity of the first irradiation light using the first irradiation unit. Thus, the spectroscopic analysis device can, for example, appropriately control the irradiation intensity of the first irradiation light separated into a step for large amounts of attached material and a step for small amounts. For example, the spectroscopic analysis device can irradiate a high intensity first irradiation light that can efficiently decompose the attached material in the step for large amounts of attached material, while in the step for small amounts of attached material, the first irradiation light can be irradiated at a minimum intensity required to make it possible to suppress deterioration of the optical waveguide.

In the spectroscopic analysis device according to one or more embodiments, the control unit may increase the irradiation intensity of the first irradiation light using the first irradiation unit when it is determined that the peak of the absorption spectrum increases and reaches the threshold value. Thus, the spectroscopic analysis device can suppress the deterioration of the optical waveguide in the step for small amounts of attached material, while making it possible to efficiently decompose the attached material in a step for large amounts of the attached material. Therefore, for example, the optical properties of the optical waveguide can be stably maintained over a longer period of time, and the product reliability of the spectroscopic analysis device is maintained over a longer period when compared to cases wherein, a high intensity first irradiation light is always transmitted to the optical waveguide.

In the spectroscopic analysis device according to one or more embodiments, respective wavelength bands of the first irradiation light and the first measured light may be included in the ultraviolet range. Thus, transition energy required to decompose high polymer organic substances such as, for example, proteins, can be sufficiently obtained. Additionally, deterioration of the metal thin film caused accompanying transmission of the first irradiation light in the optical waveguide is suppressed when compared to light having even shorter wavelengths such as X-rays. Moreover, because the wavelength is sufficiently shorter when compared to, for example, near infrared second irradiation light, the region which the first evanescent wave projects on is limited to being near the boundary surface of the metal thin film. Therefore, the spectroscopic analysis device can suppress information relating to the sample from being included in the first measured light, and accurately obtain the first information of the absorption spectrum of the attached material based on the first measured light.

The spectroscopic analysis device according to one or more embodiments may be provided with: a second irradiation unit for irradiating second irradiation light on the film; the second irradiation light generating a second evanescent wave projecting onto a region of the sample, a second detection unit for detecting second measured light based on the second irradiation light irradiated by the second irradiation unit; the second measured light including second information of an absorption spectrum of the sample, a prism that allows the second irradiation light and the second measured light to pass through, and a filter arranged between the prism and the optical waveguide, having higher transmissivity with respect to the second irradiation light than transmissivity with respect to the first irradiation light.

Thus, the incidence of the first irradiation light transmitted in the optical waveguide on the prism can be suppressed. As a result, for example, the contamination of the first irradiation light in the optical path relating to the second detection unit is suppressed, and crosstalk of the first irradiation light is suppressed. Therefore, noise based on the first irradiation light is reduced when performing optical measurement of the sample using the second detection unit. Additionally, for example, deterioration of the prism due to solarization or the like based on the first irradiation light is suppressed. Similarly, for example, deterioration based on the first irradiation light on the antireflective film with respect to the second irradiation light formed on the front surface on the optical waveguide side on the prism is suppressed.

In the spectroscopic analysis device according to one or more embodiments, respective wavelength bands of the second irradiation light and the second measured light may be included in the near infrared range. Thus, the spectroscopic analysis device can analyze the state of the sample based on the absorption spectrum derived from, for example, molecular vibrations.

The optical system according to one or more embodiments includes: a film on which a sample subject to spectroscopic analysis contacts, an optical waveguide for transmitting first irradiation light having transition energy wherein attached material attached to a boundary surface of the film decomposes, and on a front surface of the optical waveguide, a first evanescent wave is generated, being based on the first irradiation light, and the first evanescent wave is then projected on an attached region of the attached material, and a prism arranged on a side opposite the film with respect to the optical waveguide, wherein second irradiation light generating a second evanescent wave projected onto a region of the sample and absorbed into the sample is allowed to pass through.

Thus, efficiency in measuring a sample using spectroscopic analysis improves in the optical system. For example, the optical system can decompose the attached material attached to the boundary surface of the metal thin film by a first evanescent wave being generated on the front surface of the optical waveguide; the evanescent wave being based on the first irradiation light. The first evanescent wave is then projected on the attached region of the attached material. For example, the optical system can decompose and separate high polymer organic substances such as proteins that have adhered or accumulated on the boundary surface of the metal thin film. The decomposed attached material is washed away by the flow of the sample contacting the metal thin film. According to the above, the optical system can omit the cleaning treatment including wiping, cleaning using a surfactant, and surface polishing or the like, which was required in the conventional art. The optical system can thereby continuously perform measurement of the sample using spectroscopic analysis.

The method according to one or more embodiments includes a step for irradiating a first irradiation light having transition energy wherein attached material attached to a boundary surface of a film decomposes; the film being a film on which a sample subject to spectroscopic analysis contacts, and a step for transmitting the irradiated first irradiation light to the optical guide; generating a first evanescent wave on a front surface of the optical waveguide, the first evanescent wave being based on the first irradiation light; and projecting the first evanescent wave on an attached region of the attached material.

Thus, efficiency in measuring a sample using spectroscopic analysis improves. For example, the attached material attached to the boundary surface of the metal thin film can be decomposed by including a step wherein a first evanescent wave is generated on the front surface of the optical waveguide; the first evanescent wave being based on the first irradiation light and being projected on the attached region of the attached material. For example, high polymer organic substances such as proteins that have adhered or accumulated on the boundary surface of the metal thin film can be decomposed and separated. The decomposed attached material is washed away by the flow of the sample contacting the metal thin film. According to the above, the cleaning treatment including wiping, cleaning using a surfactant, and surface polishing or the like, which was required in the conventional art, can be omitted. Thus, measuring a sample using spectroscopic analysis can be continuously performed.

One or more embodiments provide a spectroscopic analysis device, optical system, and method that can improve measurement efficiency of a sample using spectroscopic analysis.

DETAILED DESCRIPTION

The background of the conventional art will be described in detail.

Conventionally, a complete reflection spectroscopy method (attenuated total reflection (ATR)) is generally known for irradiating an irradiation light from a prism edge to a sample adhered on the prism, and detecting emission light completely reflected from a prism at or greater than a critical angle. The ATR method is typical as a method for measuring a sample of an extremely small amount. When irradiation light from the prism side is incident, and the angle of incidence is greater than the critical angle, the irradiation light is completely reflected on the boundary surface between the prism and the sample. At this time, an evanescent wave based on the irradiation light is generated on the boundary surface. The ATR method is a method for obtaining an absorption spectrum of the sample using this evanescent wave.

However, the evanescent wave exists only on the frontmost surface of the prism. Therefore, the irradiation light irradiated on the sample may be faint, and the intensity of the absorption spectrum of the sample may be low. For improvement, it was conceived to excite and resonate a free electron in a metal thin film disposed between the prism and the sample with the evanescent wave to generate a surface plasmon. A surface plasmon resonance near infrared spectroscopy method was developed wherein a resonance spectrum of the surface plasmon and the absorption spectrum of the sample are overlapped, and the intensity of the absorption spectrum of the sample is seemingly increased.

In an optical system that uses conventional surface plasmon resonance near infrared spectroscopy, the irradiation light irradiated from a wideband light source is incident on a prism substrate to which a metal thin film is joined, after transmitting a light guide component such as an optical fiber, and being adjusted to be parallel by lens, mirror, or the like. The metal thin film includes, for example, gold, silver, copper, aluminum, or the like. The prism substrate includes, for example, triangular prisms, cylindrical prisms, hemispherical prisms, or the like.

The reflected light reflected on the prism substrate is concentrated by the lens, mirror, or the like. The concentrated reflected light transmits through the light guide component such as an optical fiber, and is detected by a spectrometer. A processing unit obtains information of the absorption spectrum of the sample based on detected reflected light. For example, the processing unit obtains physical information such as a refractive index, an absorption coefficient, and a film thickness of the sample by data processing with respect to information of the absorption spectrum based on the ATR method and the surface plasmon resonance near infrared spectroscopy method.

Under the condition that the optical system to which irradiation light is incident from a rear surface of the metal thin film completely reflects, when the wavelength of the evanescent wave and the wavelength of the surface plasmon match, the evanescent wave and the surface plasmon resonate and maximum light absorption is achieved. The resonance spectrum of the surface plasmon is dependent on the refractive index of the sample on the metal thin film. More specifically, the maximum absorption wavelength of the surface plasmon resonance spectrum, that is, the peak wavelength or maximum absorption angle shifts based on the refractive index of the sample. Similarly, the peak wavelength of the surface plasmon resonance spectrum changes in the wavelength axis direction by changing the angle incidence of the irradiation light with respect to the metal thin film.

Therefore, by shifting the peak wavelength of the resonance spectrum in a specific wavelength range, the maximum absorption wavelength of the resonance condition can be matched to the peak wavelength of the absorption spectrum of the sample. Thus, the intensity of the absorption spectrum of the sample seemingly increases, and the absorption spectrum due to the sample can be measured with high sensitivity.

However, in the above conventional art, an attached material attaches to the boundary surface of the metal thin film that contacts the sample subject to spectroscopic analysis. For example, high polymer organic substances such as proteins included in the sample adhere or accumulate on the boundary surface of the metal thin film. In the conventional art, measurement is only performed on the frontmost surface on the metal thin film joined to the prism substrate, and thus, when the attached material attaches to the boundary surface of the metal thin film, only spectroscopic information based on such an attached material can be obtained. For improvement, the attached material on the boundary surface is removed by performing a cleaning treatment including wiping, cleaning using a surfactant, surface polishing, and the like. However, it is not possible to continuously perform measurement of the sample using spectroscopic analysis due to such a cleaning treatment, causing decreased measurement efficiency.

A spectroscopic analysis device, optical system, and method according to one or more embodiments can improve measurement efficiency of a sample using spectroscopic analysis. Embodiments of the present invention will be described below with reference to the drawings.

Figure 1:
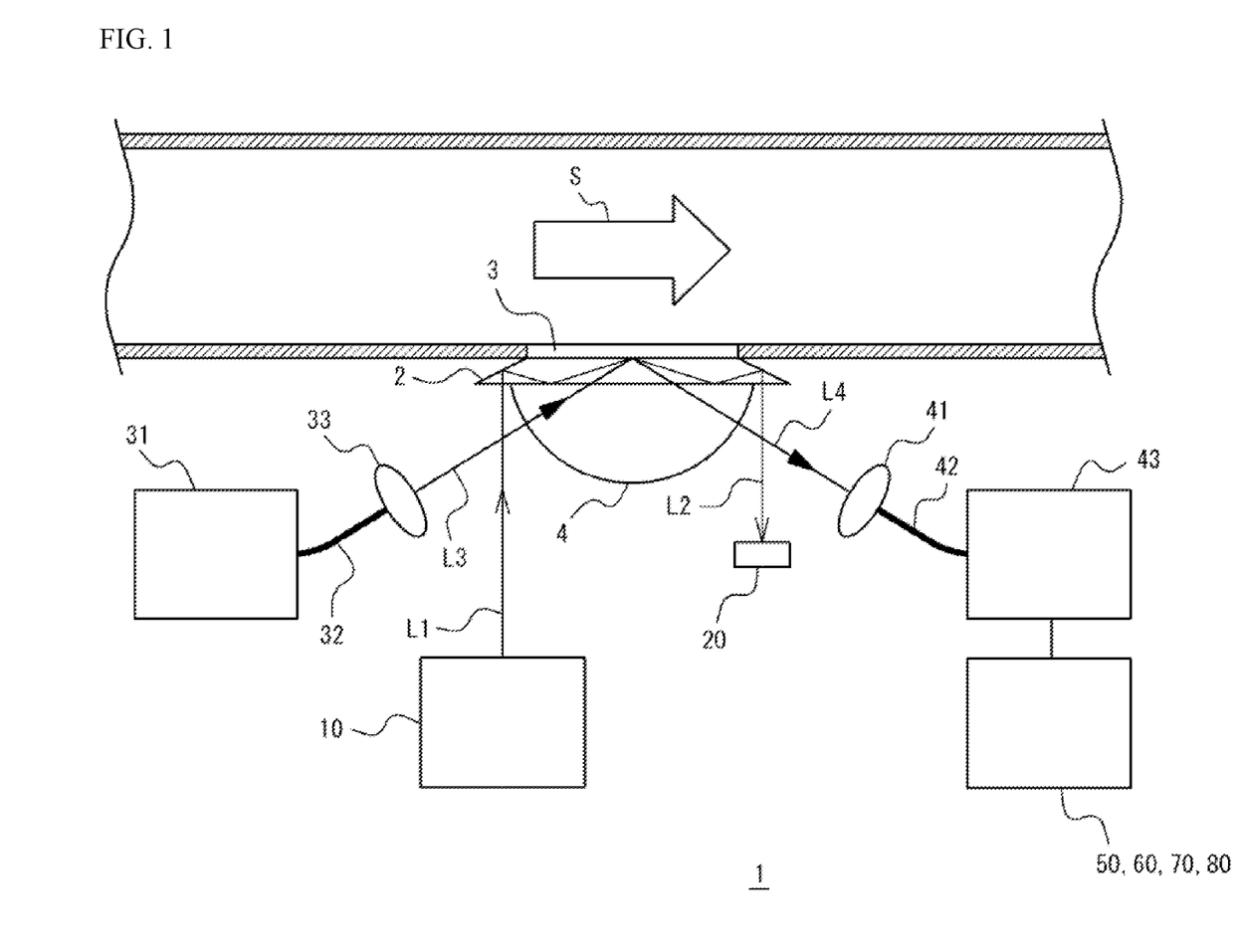
FIG. 1 is a schematic diagram illustrating a general configuration of a spectroscopic analysis device according to one or more embodiments.

FIG. 1 is a schematic diagram illustrating a general configuration of a spectroscopic analysis device 1 according to one or more embodiments. The spectroscopic analysis device 1 has a metal thin film 3 to which a sample S subject to spectroscopic analysis contacts. The metal thin film 3 includes, for example, gold, silver, copper, aluminum, or the like.

The spectroscopic analysis device 1 analyses, for example, the state of the sample S which flows in one direction in the prescribed channel and contacts the metal thin film 3 which generates a surface plasmon. In the present specification, "sample S" includes, for example, a liquid. The "state of the sample S" includes, for example, component composition including component type and ratio of the sample S, as well as any other physical or chemical parameters read from the absorption spectrum of the sample S. The sample S is not limited to the configuration of flowing in one direction as in FIG. 1, and may stop in a prescribed region on the metal thin film 3. The configuration of the spectroscopic analysis device 1 according to one or more embodiments will be mainly described with reference to FIG. 1.

The spectroscopic analysis device 1 has a first irradiation unit 10 (first irradiator) for irradiating a first irradiation light L1 having transition energy wherein attached material decomposes; said attached material being attached to the boundary surface of the metal thin film 3. In the present specification, the "boundary surface of the metal thin film 3" includes, for example, a front surface to which the sample S contacts from among the front surface of the metal thin film 3. That is, the boundary surface of the metal thin film 3 includes the front surface joined to an optical waveguide 2, and the surface on the opposite side. In the present specification, "attached material" includes any organic material attached to the boundary surface of the metal thin film 3, including, for example, high polymer organic substances such as proteins.

For example, the wavelength band of the first irradiation light L1 is included in the ultraviolet range. The first irradiation unit 10 has, for example, any ultraviolet light source including a xenon lamp, a light emitting diode (LED), a laser diode (LD), or the like. In the present specification, the "ultraviolet range" includes, for example, a light wavelength range of at least 50 nm and less than 450 nm. The wavelength band of the first irradiation light L1 may be, for example, at least 150 nm to no more than 300 nm, at least 175 nm to no more than 225 nm, or at least 200 nm to no more than 260 nm.

The spectroscopic analysis device 1 has the optical waveguide 2 for transmitting the first irradiation light L1 irradiated from the first irradiation unit 10. A first evanescent wave based on the first irradiation light L1 projecting into an attached region of the attached material is generated on the front surface of the optical waveguide 2. The optical waveguide 2 is, for example, joined to the metal thin film 3 on the opposite side of the sample S. The optical waveguide 2 is formed by material having a higher refractive index than a prism 4 described hereafter, in order to transmit the first irradiation light L1 for decomposing the attached material. For example, the optical waveguide 2 is formed by a material having a higher refractive index than the prism 4 described hereafter, and high transmissivity in the ultraviolet range in order to transmit ultraviolet light. For example, the optical waveguide 2 is formed by a material such as N-K5 or B270. The optical waveguide 2 can transmit the first irradiation light L1 in the optical waveguide 2 via complete reflection by being formed by a material having a higher refraction index than the prism 4 described hereafter. Thus, the optical waveguide 2 can suppress incidence of the first irradiation light L1 on the prism 4.

The spectroscopic analysis device 1 has, for example, a first detection unit 20 (first detector), for detecting first measured light L2 emitted from the optical waveguide 2 based on the first irradiation light L1 irradiated by the first irradiation unit 10; this first measured light L2 including the first information of the absorption spectrum of the attached material. For example, the wavelength band of the first measured light L2 is included in the ultraviolet range. The first detection unit 20 has, for example, any spectrometer capable of detecting the first measured light L2. For example, the first detection unit 20 is disposed on the same side as the first irradiation unit 10 with respect to the optical waveguide 2.

Figure 2:
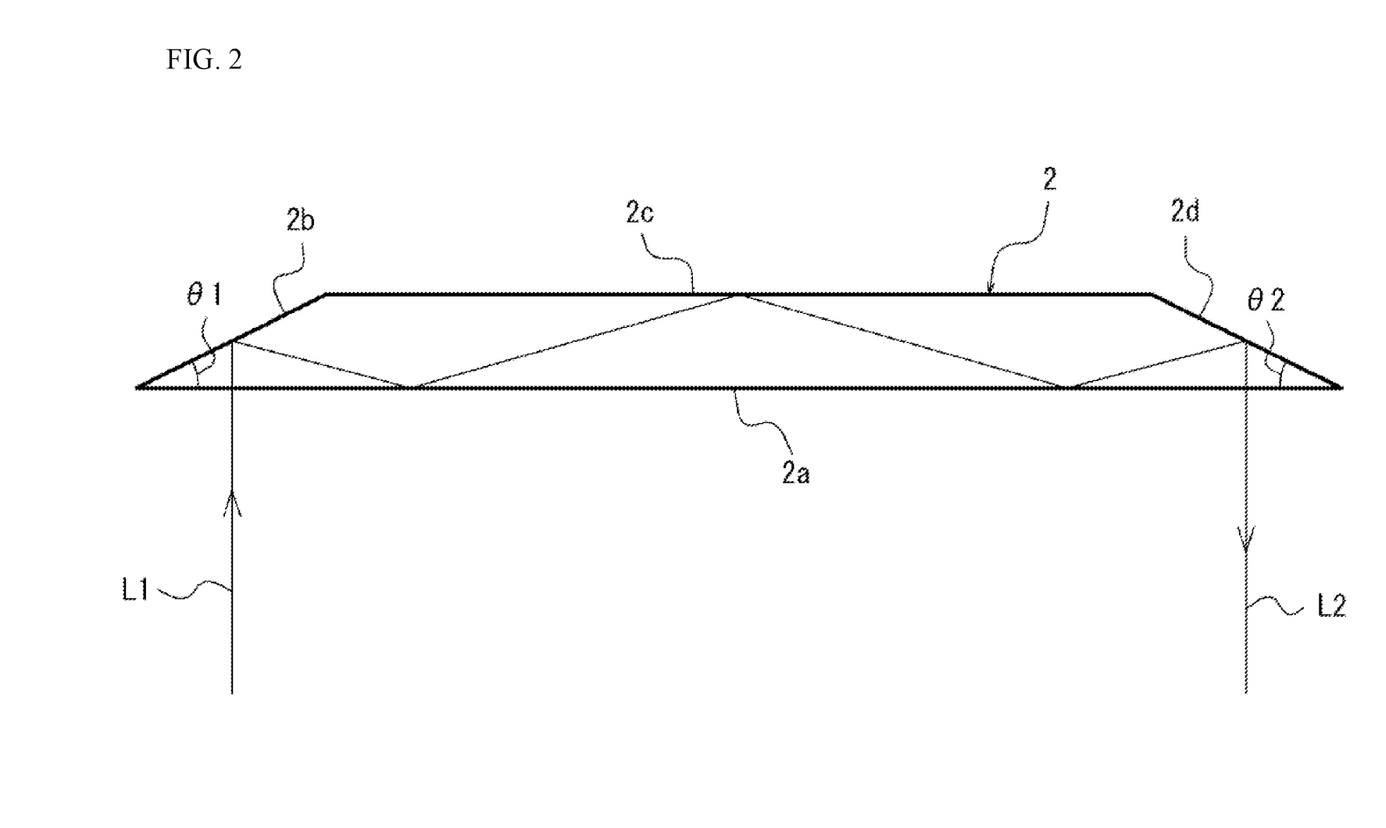
FIG. 2 is a schematic diagram illustrating a general configuration of an optical waveguide in FIG. 1.

FIG. 2 is a schematic diagram illustrating a general configuration of the optical waveguide 2 in FIG. 1. As indicated in FIG. 2, the optical waveguide 2 has a front surface 2a located on the opposite side as the metal thin film 3, a reflective surface 2b inclined at an angle θ1 with respect to the front surface 2a, a front surface 2c located on the metal thin film 3 side, and a reflective surface 2d inclined at an angle θ2 with respect to the front surface 2a.

The first irradiation light L1 irradiated from the first irradiation unit 10 is, for example, incident on the front surface 2a of the optical waveguide 2 from below, and is completely reflected by the reflective surface 2b inside the optical waveguide 2. The first irradiation light L1 transmits while being completely reflected inside the optical waveguide 2. For example, the angle θ1 formed by the reflective surface 2b and front surface 2a is 10 degrees or less in order to guide the first irradiation light L1 in the optical waveguide 2 while meeting the condition of complete reflection. More specifically, the complete reflection angle θ is acquired from the below formula 1 based on Snell's law, and, for example, the angle θ1 is no more than the value acquired in formula 1.

$$\theta = \arcsin(n2/n1) \qquad \text{(Formula 1)}$$

Here, n1 is the refractive index of the optical waveguide 2, and n2 is the external refractive index of the optical waveguide 2.

A first evanescent wave based on the first irradiation light L1 is generated on the front surfaces 2a and 2c of the optical waveguide 2. Note that in FIG. 1 and FIG. 2, the number of times the first irradiation light L1 is reflected in the optical waveguide 2 is not limited to the illustrated contents. The first irradiation light L1 may be reflected more times.

The first evanescent wave is generated on the front surface 2c of the metal thin film 3 side of the optical waveguide 2, and the first evanescent wave is then projected into the attached region of the attached material attached to the boundary surface of the metal thin film 3. The first evanescent wave is absorbed by the attached material attached to the boundary surface of the metal thin film 3. The attached material is excited by the transition energy of the first evanescent wave, and decomposed by a chemical reaction. The decomposed attached material is washed away by the flow of the sample S.

The first measured light L2 based on the first irradiation light L1, that includes the first information of the absorption spectrum of the attached material, is completely reflected by the reflective surface 2d inside the optical waveguide 2 and emitted from the optical waveguide 2. For example, the angle θ2 formed by the reflective surface 2d and the front surface 2a is no more than 10 degrees. For example, the angle θ1 and the angle θ2 are mutually identical.

The first measured light L2 is incident on the first detection unit 20 after being emitted from the optical waveguide 2. Note that in FIG. 1 and FIG. 2, the number of times the first measured light L2 is reflected in the optical waveguide 2 is not limited to the illustrated contents. The first measured light L2 may be reflected more times.

As illustrated in FIG. 1, the spectroscopic analysis device 1 has the prism 4 that is displaced on the opposite side as the metal thin film 3 with respect to the optical waveguide 2, and is joined to the optical waveguide 2. The prism 4 is, for example, formed in a hemisphere by an optical glass such as BK-7. The prism 4 is not limited to this and may, for example, be formed as a triangular prism or a cylindrical prism. For example, the prism 4 can suppress the entry of ultraviolet light transmitting through the optical waveguide 2 as background light into measured optical path of the sample S by being formed by a material having low transmissivity in the ultraviolet range such as BK-7.

The spectroscopic analysis device 1 has a wideband light source 31 that irradiates a second irradiation light L3. For example, the wavelength band of the second irradiation light L3 is included in the near infrared range. The wideband light source 31 includes, for example, a light source having a light emitting element in the near infrared range. In the present specification, the "near infrared range" includes, for example, a light wavelength range of at least 800 nm and less than 2.5 µm.

The spectroscopic analysis device 1 has a light guide component 32 for guiding the second irradiation light L3 irradiated from the wideband light source 31. The light guide component 32 may include, for example, an optical fiber, or a free-space optical component such as a lens or a mirror. The spectroscopic analysis device 1 has a light parallelization component 33 for adjusting the second irradiation light L3 emitted from the light guide component 32 to be parallel. The light parallelization component 33 includes, for example, a free-space optical component such as a lens or a mirror.

The spectroscopic analysis device 1 has a light condensing component 41 for condensing a second measured light L4 emitted from the prism 4. The light condensing component 41 includes, for example, a free-space optical component such as a lens or a mirror. The spectroscopic analysis device 1 has a light guide component 42 for guiding the second measured light L4 condensed by the light condensing component 41. The light guide component 42 may include, for example, an optical fiber, or a free-space optical component such as a lens or a mirror. The spectroscopic analysis device 1 has a detection unit 43 for detecting the second measured light L4 transmitted through the light guide component 42. For example, the wavelength band of the second measured light L4 is included in the near infrared range. The detection unit 43 includes, for example, a spectrometer having a near infrared range spectroscopic element and a near infrared range detection element.

The second irradiation light L3 emitted from the light parallelization component 33 is incident on the prism 4 to which the optical waveguide 2 and the metal thin film 3 are joined. The second irradiation light L3 passes through the prism 4 and is incident on the optical waveguide 2, for example, diagonally from below, and is completely reflected on the boundary surface between the optical waveguide 2 and the metal thin film 3. At this time, a second evanescent wave based on the second irradiation light L3 is generated on the front surface 2c of the optical waveguide 2.

The second evanescent wave generated on the front surface 2c of the metal thin film 3 side of the optical waveguide 2 is projected into the region where the sample S flows in one direction on the metal thin film 3. The second evanescent wave is absorbed by the sample S flowing in one direction on the metal thin film 3.

The second measured light L4 based on the second irradiation light L3 and including the second information of the absorption spectrum of the sample S, passes through the optical waveguide 2 and the prism 4 and is emitted from the prism 4. The second measured light L4 is incident on the detection unit 43 through the light condensing component 41 and the light guide component 42 after being emitted from the prism 4.

Under the condition that the optical system to which the second irradiation light L3 is incident from a rear surface of the metal thin film 3 completely reflects, when the wavelength of the second evanescent wave and the wavelength of the surface plasmon match, the second evanescent wave and the surface plasmon resonate and maximum light absorption is achieved. Such a complete reflection condition includes a condition for complete reflection of the second irradiation light L3 on the rear surface of the metal thin film 3, that is, on the boundary surface between the metal thin film 3 and the optical waveguide 2. The resonance spectrum of the surface plasmon is dependent on the refractive index of the sample S on the metal thin film 3. More specifically, the maximum absorption wavelength of the surface plasmon resonance spectrum, that is, the peak wavelength or maximum absorption angle shifts based on the refractive index of the sample S. Similarly, the peak wavelength of the surface plasmon resonance spectrum is changed in the wavelength axis direction by changing the angle of incidence of the second irradiation light L3 with respect to the metal thin film 3.

Therefore, by shifting the peak wavelength of the resonance spectrum in a specific wavelength range, the maximum absorption wavelength of the resonance condition can be matched to the peak wavelength of the absorption spectrum of the sample S. Thus, the intensity of the absorption spectrum of the sample S seemingly increases, and the measurement sensitivity of the absorption spectrum due to the sample S is improved.

Figure 3:
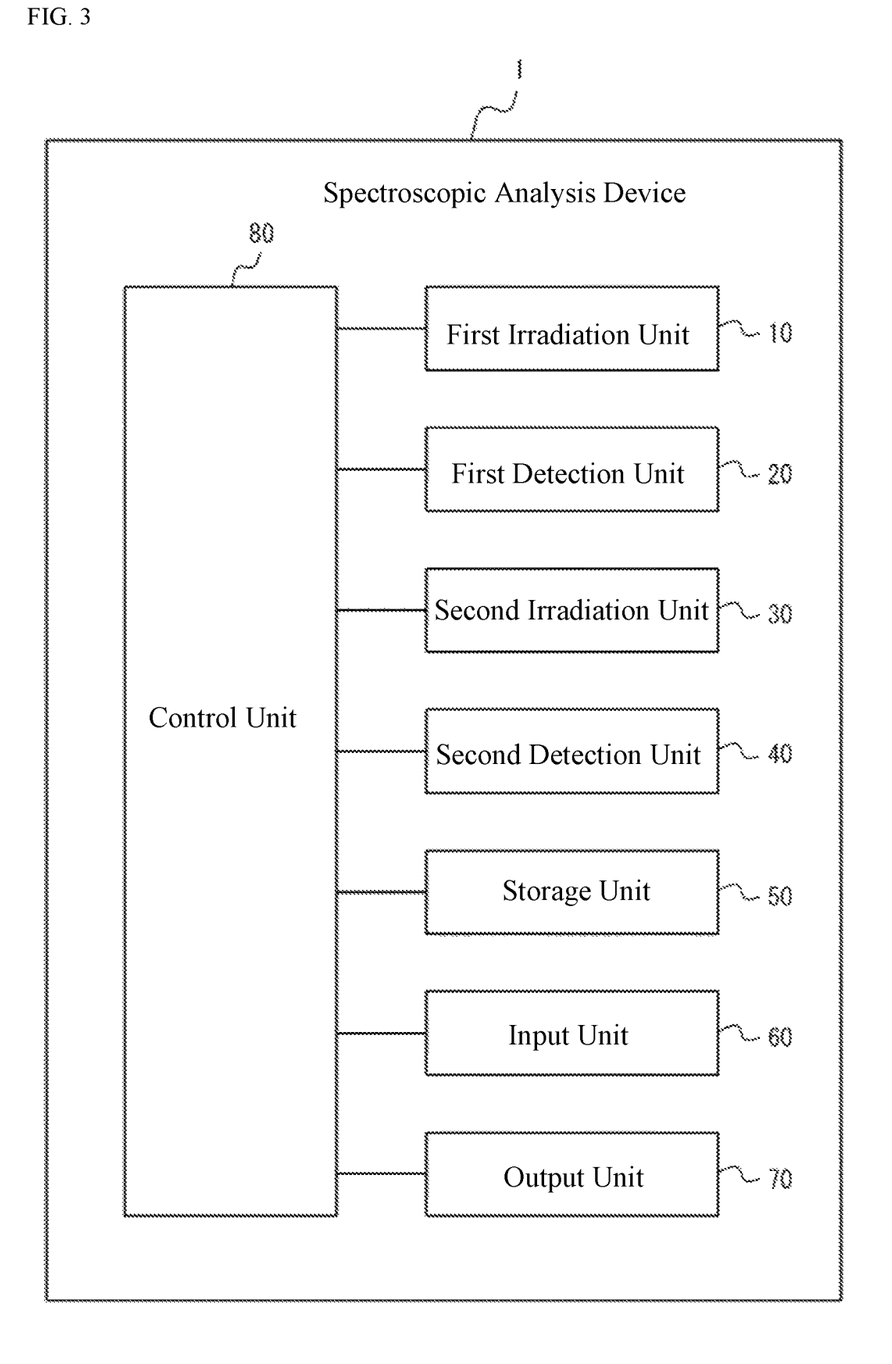
FIG. 3 is a block diagram corresponding to the general configuration of the spectroscopic analysis device in FIG. 1.

FIG. 3 is a block diagram corresponding to the general configuration of the spectroscopic analysis device 1 in FIG. 1. The configuration of the spectroscopic analysis device 1 according to one or more embodiments will be further described with reference to FIG. 3.

In addition to the first irradiation unit 10 and the first detection unit 20 described above, the spectroscopic analysis device 1 has a second irradiation unit 30 (second irradiator), a second detection unit 40 (second detector), a storage unit 50, an input unit 60, an output unit 70, and a control unit 80 (controller).

The second irradiation unit 30 has an optional optical system for irradiating the metal thin film 3 with a second irradiation light L3 for generating a second evanescent wave projecting into the region of the sample S. For example, the second irradiation unit 30 has the wideband light source 31, the light guide component 32, and the light parallelization component 33 described above.

The second detection unit 40 is a second measurement light L4 based on the second irradiation light L3 irradiated by the second irradiation unit 30, and has an optional optical system for detecting the second measurement light L4 including second information of the absorption spectrum of the sample S. For example, the second detection unit 40 has the light condensing component 41, the light guide component 42, and the detection unit 43 described above.

The storage unit 50 includes an optional storage module including a hard disk drive (HDD), a solid state drive (SSD), an electrically erasable programmable read-only memory (EEPROM), a read-only memory (ROM), and a random access memory (RAM). The storage unit 50 may function as, for example, a main storage device, an auxiliary storage device, or a cache memory. The storage unit 50 stores any information used to operate the spectroscopic analysis device 1.

For example, the storage unit 50 stores first information of the absorption spectrum of the attached material having the first measured light L2 detected by the first detection unit 20.

For example, the storage unit 50 stores second information of the absorption spectrum of the sample S having the second measured light L4 detected by the second detection unit 40. For example, the storage unit 50 may store a system program and an application program or the like. The storage unit 50 is not limited to being installed in the spectroscopic analysis device 1, and may include an external storage module connected via a digital input/output port such as a universal serial bus (USB).

The input unit 60 includes one or more input interface for receiving an input operation from a user and obtaining input information based on user operation. For example, the input unit 60 includes a physical key, a capacitance key, a touch screen integrally provided with the display of the output unit 70, a microphone for receiving audio input, and the like, but is not limited to these.

The output unit 70 includes one or more output interface for outputting information to the user. For example, the output unit 70 is a display that outputs information as an image, a speaker that outputs information as audio, or the like, but is not limited to these.

The control unit 80 includes one or more processor. According to one or more embodiments, the "processor" is a general processor or a dedicated processor specializing in a specific process, but is not limited to these. The control unit 80 is connected to be able to communicate with each component that configures the spectroscopic analysis device 1, and controls the operation of the entire spectroscopic analysis device 1.

For example, the control unit 80 controls the first irradiation unit 10, and irradiates the first irradiation light L1 to decompose the attached material that is attached to the boundary surface of the metal thin film 3. For example, the control unit 80 obtains first information of the absorption spectrum of the attached material that is attached to the boundary surface of the metal thin film 3 from the first detection unit 20.

For example, the control unit 80 controls the second irradiation unit 30, and irradiates the second irradiation light L3 to perform spectroscopic analysis on the state of the sample S flowing in one direction on the metal thin film 3. For example, the control unit 80 obtains second information of the absorption spectrum of the sample S flowing in one direction on the metal thin film 3 from the second detection unit 40.

For example, the control unit 80 stores the obtained first information and second information in the storage unit 50. For example, the control unit 80 may output the obtained first information and second information to the user via the output unit 70. That is, the control unit 80 may display the absorption spectrum of the attached material attached to the boundary surface of the metal thin film 3 using the output unit 70 based on the obtained first information. The control unit 80 may display the absorption spectrum of the sample S flowing in one direction on the metal thin film 3 using the output unit 70 based on the obtained second information.

For example, the control unit 80 calculates a peak intensity of the absorption spectrum of the attached material that is attached to the boundary surface of the metal thin film 3 based on the first information obtained from the first detection unit 20. For example, the control unit 80 analyzes the state of the sample S flowing in one direction on the metal thin film 3 based on the second information obtained from the second detection unit 40. For example, the control unit 80 may output this calculated or analyzed information to the user via the output unit 70.

For example, the control unit 80 determines whether the peak of the absorption spectrum of the attached material attached to the boundary surface of the metal thin film 3 has reached a threshold value relating to spectrum intensity based on the first information obtained from the first detection unit 20. For example, the control unit 80 changes the irradiation intensity of the first irradiation light L1 using the first irradiation unit 10 when it is determined that the threshold value has been reached. In the present specification, the "threshold value" may include, for example, a value relating to spectrum intensity appropriately determined by input information based on an input operation of the user using the input unit 60, and may include a value relating to spectrum intensity predetermined by initial settings when the spectroscopic analysis device 1 is manufactured as a product.

For example, the control unit 80 may increase the irradiation intensity of the first irradiation light L1 using the first irradiation unit 10 when it is determined that the peak of the absorption spectrum increases and reaches the threshold value. Conversely, the control unit 80 may decrease the irradiation intensity of the first irradiation light L1 using the first irradiation unit 10 when it is determined that the peak of the absorption spectrum decreases and reaches the threshold value.

Figure 4:
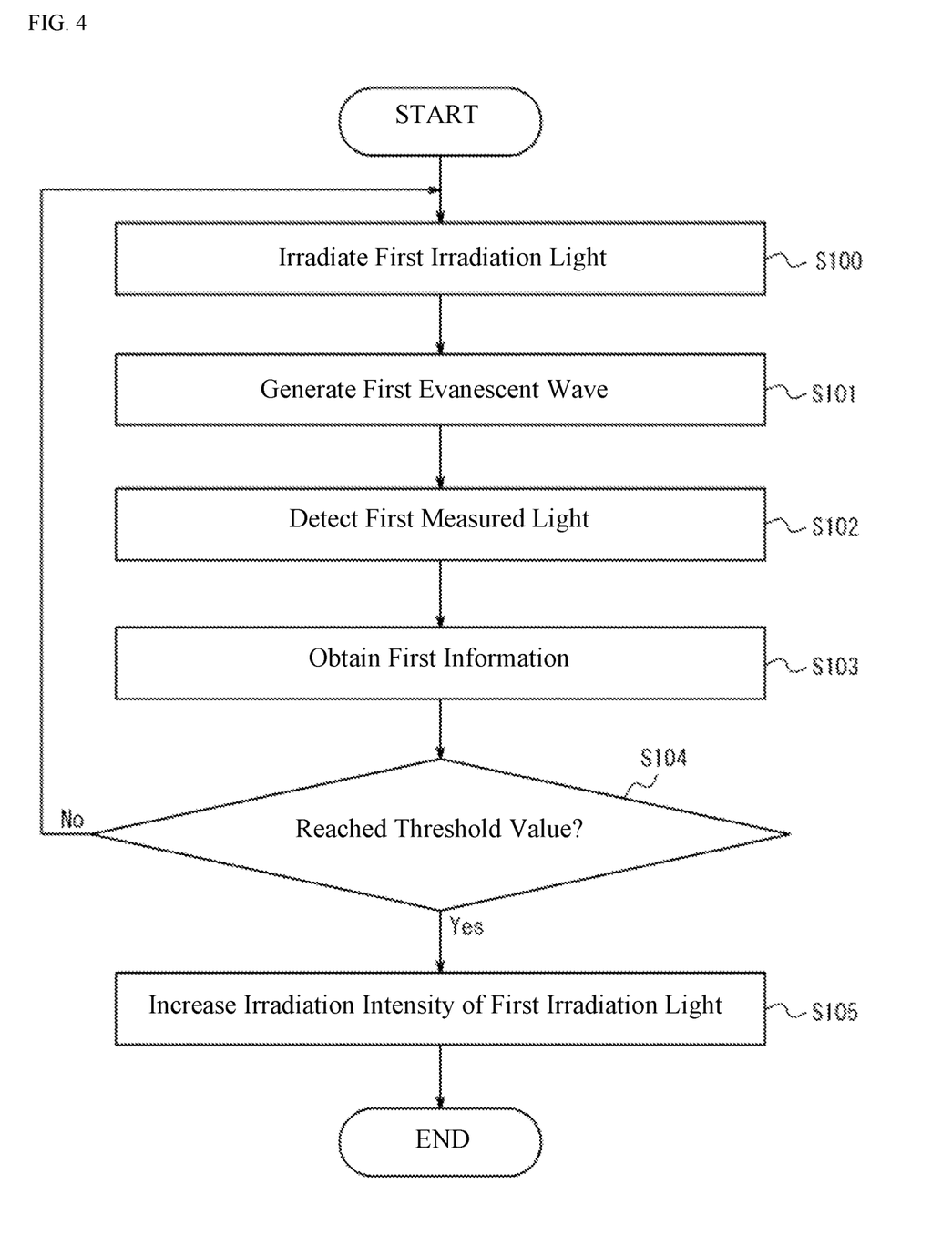
FIG. 4 is a flowchart for describing a first example of operation of the spectroscopic analysis device in FIG. 1.

FIG. 4 is a flowchart for describing a first example of operation of the spectroscopic analysis device 1 in FIG. 1. The first example of the operation of the spectroscopic analysis device 1 will mainly be described with reference to FIG. 4. In the first example of the operation of the spectroscopic analysis device 1, a case is presumed in which the peak of the absorption spectrum of the attached material attached to the boundary surface of the metal thin film 3 increases and reaches the threshold value. A description similar to below also applies to a case in which the peak of the absorption spectrum decreases and reaches the threshold value.

In step S100, the spectroscopic analysis device 1 irradiates, using the first irradiation unit 10, the first irradiation light L1 having transition energy wherein attached material decomposes; said attached material being attached to the boundary surface of the metal thin film 3 to which the sample S to undergo spectroscopic analysis contacts. For example, the control unit 80 controls the first irradiation unit 10 and irradiates the first irradiation light L1 at a first irradiation intensity. In the present specification, "first irradiation intensity" includes, for example, an irradiation intensity that is equal to or greater than the minimum intensity of the first irradiation light L1 required for the control unit 80 to obtain the first information of the absorption spectrum of the attached material attached to the boundary surface of the metal thin film 3, and this irradiation intensity is around an amount wherein deterioration of the optical waveguide 2 accompanying the transmission of the first irradiation light L1 is sufficiently suppressed.

In step S101, the spectroscopic analysis device 1 transmits the first irradiation light L1 irradiated in step S100 to the optical waveguide 2, generates, on the front surface 2c of the optical waveguide 2, a first evanescent wave based on the first irradiation light L1, and projects the first evanescent wave on the attached region of the attached material attached to the boundary surface of the metal thin film 3.

In step S102, the spectroscopic analysis device 1 detects, using the first detection unit 20, the first measured light L2 emitted from the optical waveguide 2 based on the first irradiation light L1 irradiated in step S100; this first measured light L2 including the first information of the absorption spectrum of the attached material.

In step S103, the spectroscopic analysis device 1 obtains the first information of the absorption spectrum of the attached material attached to the boundary surface of the metal thin film 3 based on the first measured light L2 detected by the first detection unit 20 in step S102.

In step S104, the spectroscopic analysis device 1 determines whether the peak of the absorption spectrum of the attached material attached to the boundary surface of the metal thin film 3 has reached a threshold value relating to spectrum intensity based on the first information obtained from the first detection unit 20 in step S103. The spectroscopic analysis device 1 performs the processing in step S105 when it is determined that the peak has reached the threshold value. The spectroscopic analysis device 1 performs the processing in step S100 again when it is determined that the peak has not reached the threshold value.

In step S105, when it is determined that the threshold value has been reached in step S104, the spectroscopic analysis device 1 increases the irradiation intensity of the first irradiation light L1 using the first irradiation unit 10. For example, the control unit 80 controls the first irradiation unit 10 and irradiates the first irradiation light L1 at a second irradiation intensity. In the present specification, the "second irradiation intensity" includes an irradiation intensity that is equal to or less than the maximum intensity of the first irradiation light L1 that the first irradiation unit 10 can irradiate, and this irradiation intensity is around an amount wherein the attached material attached the boundary surface of the metal thin film 3 can be efficiently decomposed. The second irradiation intensity is sufficiently larger than the first irradiation intensity.

Figure 5:
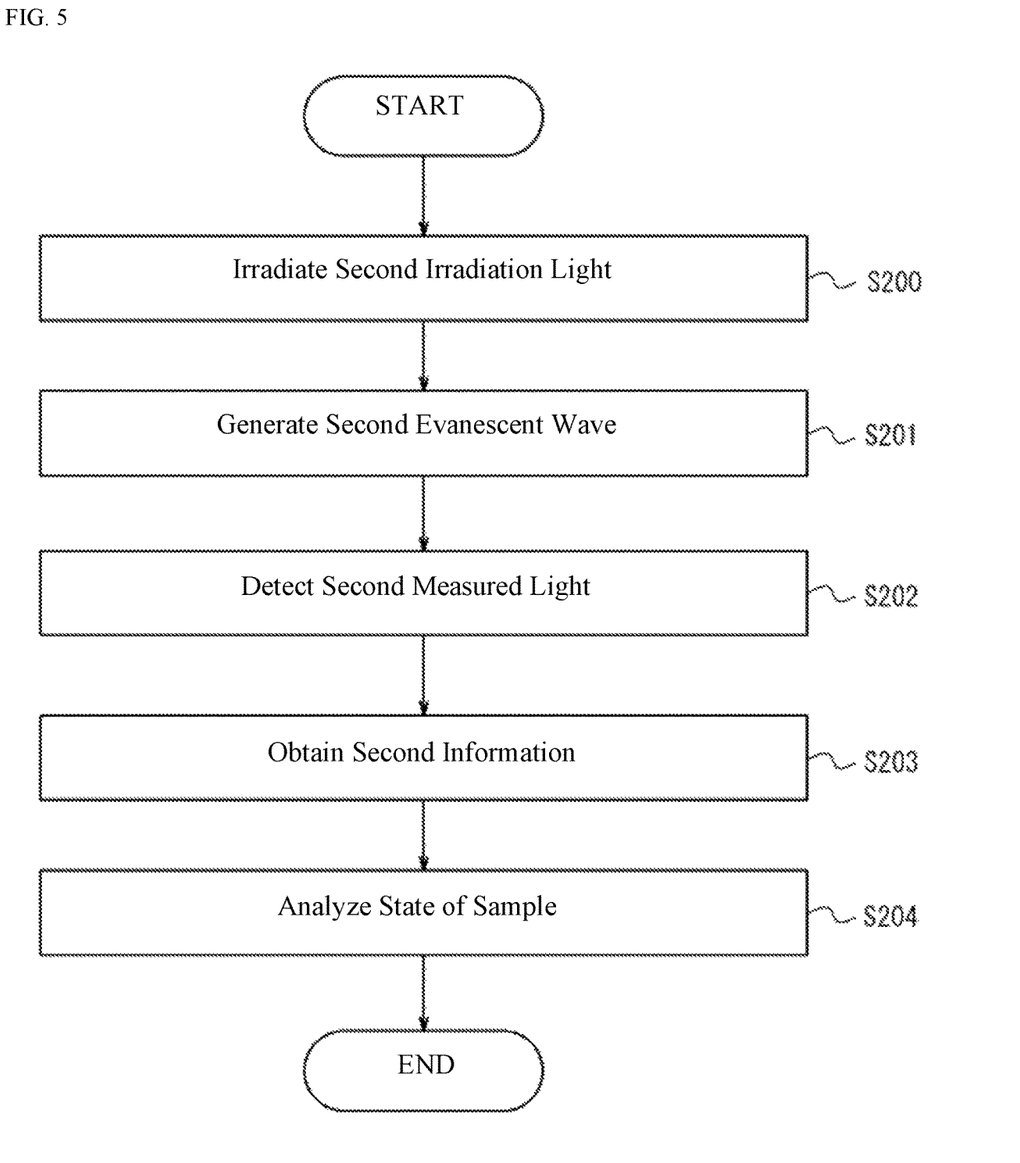
FIG. 5 is a flowchart for describing a second example of operation of the spectroscopic analysis device in FIG. 1.

FIG. 5 is a flowchart for describing a second example of operation of the spectroscopic analysis device 1 in FIG. 1. The second example of the operation of the spectroscopic analysis device 1 will mainly be described with reference to FIG. 5.

In step S200, the spectroscopic analysis device 1 irradiates, using the second irradiation unit 30, the second irradiation light L3 to perform spectroscopic analysis on the state of the sample S flowing in one direction on the metal thin film 3.

In step S201, the spectroscopic analysis device 1 completely reflects the second irradiation light L3 irradiated in step S200 on the boundary surface between the optical waveguide 2 and the metal thin film 3, and generates a second evanescent wave projected on a region of the sample S.

In step S202, the spectroscopic analysis device 1 detects, using the second detection unit 40, the second measured light L4 emitted from the prism 4 based on the second irradiation light L3 irradiated in step S200; this second measured light L4 including the second information of the absorption spectrum of the sample S.

In step S203, the spectroscopic analysis device 1 obtains the second information of the absorption spectrum of the sample S flowing in one direction on the metal thin film 3 based on the second measured light L4 detected by the second detection unit 40 in step S202.

In step S204, the spectroscopic analysis device 1 analyzes the state of the sample S flowing in one direction on the metal thin film 3 based on the second information obtained from the second detection unit 40 in step S203.

According the spectroscopic analysis device 1 according to one or more embodiments, as described above, the efficiency of measuring the sample S using spectroscopic analysis improves. For example, the spectroscopic analysis device 1 can decompose the attached material attached to the boundary surface of the metal thin film 3 by a first evanescent wave being generated on the front surface 2c of the optical waveguide 2; the evanescent wave being based on the first irradiation light L1 and being projected on the attached region of the attached material. For example, the spectroscopic analysis device 1 can decompose and separate high polymer organic substances such as proteins that have adhered or accumulated on the boundary surface of the metal thin film 3. The decomposed attached material is washed away by the flow of the sample S contacting the metal thin film 3. According to the above, the spectroscopic analysis device 1 can omit the cleaning treatment including wiping, cleaning using a surfactant, and surface polishing or the like, which was required in the conventional art. The spectroscopic analysis device 1 can thereby continuously perform measurement of the sample S using spectroscopic analysis.

Even if the sample S stops at a prescribed region on the metal thin film 3, only simple work of wiping or absorbing the attached material decomposed by the first irradiation light L1 is required, and complex work such as cleaning using a surfactant and surface polishing is not required. Therefore, the spectroscopic analysis device 1 can suppress the time between when measurement of the sample S using spectroscopic analysis is stopped and the cleaning treatment is performed to a minimum, and can improve the efficiency of measuring the sample S using spectroscopic analysis.

Because the efficiency of measuring the sample S using spectroscopic analysis is thus improved, the measurement time is shortened when compared to the conventional art. Additionally, the cost required to keep or maintain the spectroscopic analysis device 1 can be reduced when compared to the conventional art. Furthermore, using the spectroscopic analysis device 1, attached material attached to the boundary surface of the metal thin film 3 is easily removed, and measurement errors due to attached material are easily prevented. Therefore, the long term stability relating to measurement improves, and the product reliability of the spectroscopic analysis device 1 also improves.

Because the optical waveguide 2 has the completely reflecting reflective surface 2b such that the first irradiation light L1 incident on the optical waveguide 2 is transmitted while being completely reflected in the optical waveguide 2, incidence of the first irradiation light L1 transmitted in the optical waveguide 2 on the exterior of the optical waveguide 2, for example, the prism 4, can be controlled. Thus, for example, the contamination of the first irradiation light L1 in the optical path relating to the second detection unit 40 is suppressed, and crosstalk of the first irradiation light L1 is suppressed. Therefore, noise based on the first irradiation light L1 is reduced when performing optical measurement of the sample S using the second detection unit 40. Additionally, for example, deterioration of the prism 4 due to solarization or the like based on the first irradiation light L1 is suppressed. Similarly, deterioration based on the first irradiation light L1 on the antireflective film with respect to the second irradiation light L3 formed on the front surface on the side of the optical waveguide 2 on the prism 4 is suppressed.

Because the optical waveguide 2 has the reflective surface 2b, almost all of the first irradiation light L1 irradiated from the first irradiation unit 10 can be coupled in the optical waveguide 2. "Coupled in the optical waveguide 2" means that the first irradiation light L1 is guided while being completely reflected in the optical waveguide 2. For example, when compared to other cases wherein the first irradiation light L1 is coupled in the optical waveguide 2 from the left side in FIG. 1, the freedom in design is improved in relation to the optical system for making the first irradiation light L1 incident on the optical waveguide 2. Therefore, it is simpler when compared to other cases wherein coupling loss of the first irradiation light L1 with respect to the optical waveguide 2 is reduced.

Because the spectroscopic analysis device 1 has the first detection unit 20 that detects the first measured light L2 including the first information of the absorption spectrum of the attached material, it can identify changes in the absorption spectrum. Thus, the spectroscopic analysis device 1 detects the attaching of the attached material based on changes in the absorption spectrum and can perform a treatment for decomposing the attached material based on the first irradiation light L1 at the appropriate timing. Additionally, the spectroscopic analysis device 1 can easily detect whether decomposition of the attached material by the first irradiation light L1 has been surely achieved based on changes in the absorption spectrum.

Similarly, the user can understand such changes from the state of the absorption spectrum, for example, displayed on the output unit 70. Thus, the user understands the attaching of the attached material based on changes in the absorption spectrum and can make the spectroscopic analysis device 1 perform a treatment for decomposing the attached material based on the first irradiation light L1 at the appropriate timing. Additionally, the user can easily recognize whether decomposition of the attached material by the first irradiation light L1 has been surely achieved based on changes in the absorption spectrum.

By changing the irradiation intensity of the first irradiation light L1 using the first irradiation unit 10 when it is determined that the threshold value has been reached, the spectroscopic analysis device 1 can appropriately control the irradiation intensity of the first irradiation light L1 separated into a step for large amounts of attached material and a step for small amounts. For example, the spectroscopic analysis device 1 can irradiate a high intensity first irradiation light L1 that can efficiently decompose the attached material in the step for large amounts of attached material, while in the step for small amounts of attached material, the first irradiation light L1 can be irradiated at a minimum intensity required to make it possible to suppress deterioration of the optical waveguide 2.

By using the first irradiation unit 10 to increase the irradiation intensity of the first irradiation light L1 when it is determined that the peak of the absorption spectrum has increased and reached the threshold value, the spectroscopic analysis device 1 makes it possible to suppress deterioration of the optical waveguide 2 in a step for a small amount of attached material, while making it possible to efficiently decompose the attached material in a step for a large amount of attached material. Therefore, for example, the optical properties of the optical waveguide 2 can be stably maintained over a longer period of time, and the product reliability of the spectroscopic analysis device 1 is maintained over a longer period when compared to cases wherein, a high intensity first irradiation light L1 is always transmitted to the optical waveguide 2.

Because the respective wavelength bands of the first irradiation light L1 and the first measured light L2 are included in the ultraviolet region, transition energy required to decompose high polymer organic substances such as, for example, proteins, is sufficiently obtained. Additionally, deterioration of the metal thin film 3 caused accompanying transmission of the first irradiation light L1 in the optical waveguide 2 is suppressed when compared to light having even shorter wavelengths such as X-rays. Moreover, because the wavelength is sufficiently shorter when compared to, for example, near infrared second irradiation light L3, the region which the first evanescent wave projects on is limited to being near the boundary surface of the metal thin film 3. Therefore, the spectroscopic analysis device 1 can suppress information relating to the sample S from being included in the first measured light L2, and accurately obtain the first information of the absorption spectrum of the attached material based on the first measured light L2.

Because the respective wavelength bands of the second irradiation light L3 and the second measured light L4 are included in the infrared region, the spectroscopic analysis device 1 can analyze the state of the sample S based on the absorption spectrum derived from, for example, molecular vibrations.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

For example, the present disclosure can also be realized as a program describing content of processing for realizing the various functions of the spectroscopic analysis device 1 described above, or a storage medium for recording a program. It should be understood that the scope of the present disclosure also includes the above.

For example, the shape, arrangement, orientation, and number of the various components described above are not limited to the content in the descriptions above and disclosure in the drawings. The shape, arrangement, orientation, and number of the various components may be configured in any manner as long as the functions thereof can be realized.

Figure 6:
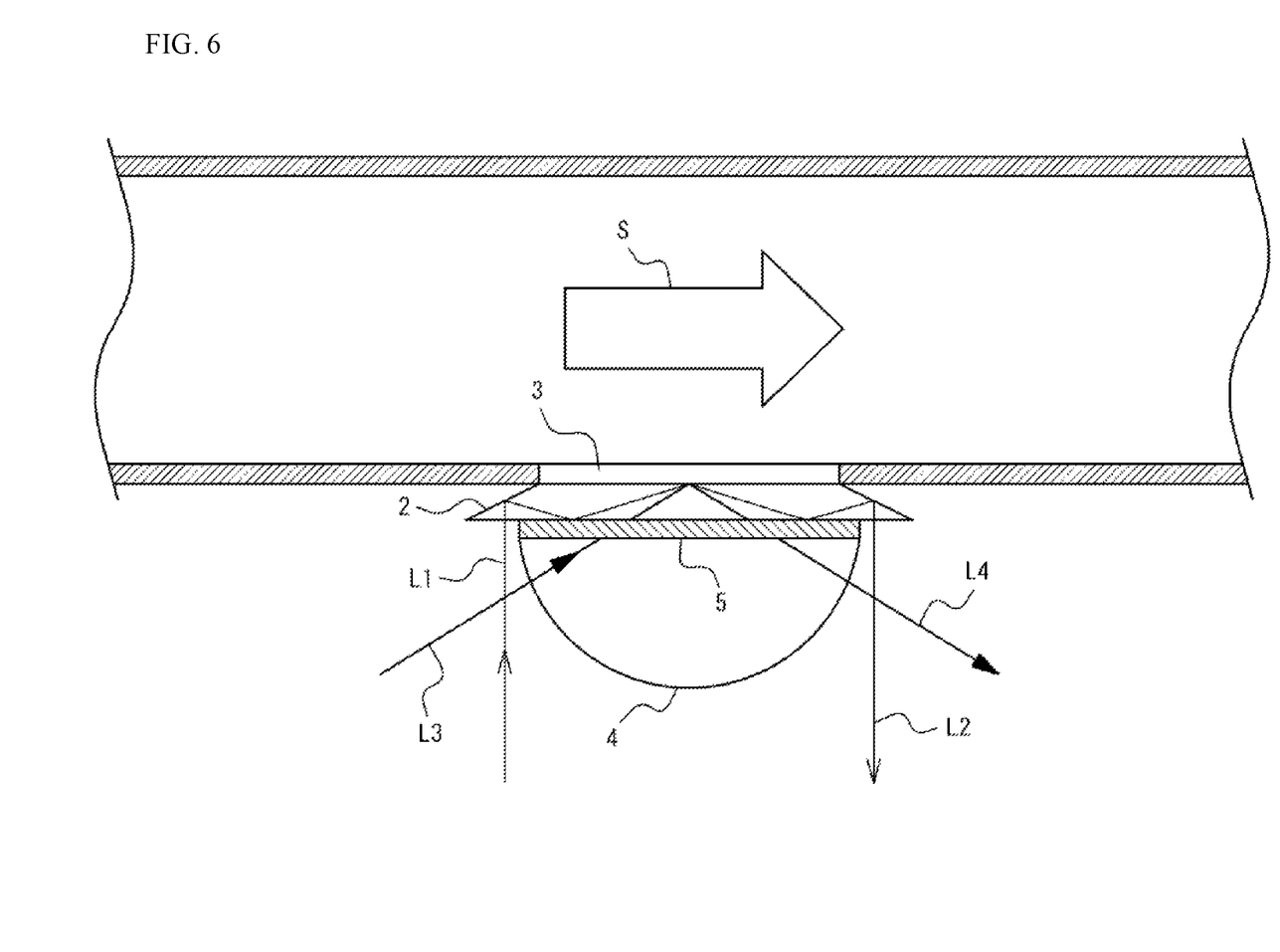
FIG. 6 is a schematic diagram illustrating a variation of the spectroscopic analysis device in FIG. 1.

FIG. 6 is a schematic diagram illustrating a variation of the spectroscopic analysis device 1 in FIG. 1. The variation of the spectroscopic analysis device 1 will mainly be described with reference to FIG. 6.

For example, the spectroscopic analysis device 1 may also have a filter 5 arranged between the prism 4 and the optical waveguide 2 and having a higher transmissivity with respect to the second irradiation light L3 than transmissivity with respect to the first irradiation light L1. For example, the filter 5 may include a filter that does not allow the first irradiation light L1 to pass through but allows the second irradiation light L3 to pass through.

For example, the filter 5 may be configured by a dielectric multilayer layered on the front surface of the optical waveguide 2 side of the prism 4, or instead of this or in addition to this, may be configured by an adhesive including UV curing resin or the like for joining the prism 4 and the optical waveguide 2. Alternatively, the filter 5 may be configured by an antireflective film with respect to the second irradiation light L3 formed on the front surface on the optical waveguide 2 side of the prism 4. That is, this antireflective film does not reflect the second irradiation light L3 and allows it to pass through, while it does not allow the first irradiation light L1 to pass through.

Because the spectroscopic analysis device 1 has the filter 5, the incidence of the first irradiation light L1 transmitted in the optical waveguide 2 to the prism 4 can be suppressed. Thus, for example, the contamination of the first irradiation light L1 in the optical path relating to the second detection unit 40 is suppressed, and crosstalk of the first irradiation light L1 is suppressed. Therefore, noise based on the first irradiation light L1 is reduced when performing optical measurement of the sample S using the second detection unit 40. Additionally, for example, deterioration of the prism 4 due to solarization or the like based on the first irradiation light L1 is suppressed. Similarly, deterioration based on the first irradiation light L1 on the antireflective film with respect to the second irradiation light L3 formed on the front surface on the side of the optical waveguide 2 on the prism 4 is suppressed.

In the description above, the spectroscopic analysis device 1 was described as having a first detection unit 20, but the present disclosure is not limited to this. The spectroscopic analysis device 1 may have any absorbing body that can absorb the first irradiation light L1 emitted from the optical waveguide 2 to replace the first detection unit 20. Alternatively, the spectroscopic analysis device 1 may have any absorbing body that can absorb the first irradiation light L1 provided on the reflective surface 2d of the optical waveguide 2 without having the first detection unit 20. According to the above, crosstalk of the first irradiation light L1 is suppressed.

In the description above, it was described that the optical waveguide 2 has the reflective surface 2b, and by making the refractive index of the optical waveguide 2 higher than the refractive index of the prism 4, the first irradiation light L1 transmits in the optical waveguide 2 by being completely reflected, but the present disclosure is not limited to this. The optical waveguide 2 may be optical fiber formed by a core and cladding. When doing so, the first irradiation light L1 may be incident on the optical waveguide 2 from the left side in FIG. 1 instead of being incident from the lower side of the optical waveguide 2.

In the description above, it was described that the first irradiation light L1 is completely reflected by the reflective surface 2b in the optical waveguide 2, but the present disclosure is not limited to this. For example, the reflective surface 2b may not fulfill the condition of completely reflecting. When doing so, a reflective film such as metal that can reflect the first irradiation light L1 may be joined to the reflective surface 2b of the optical waveguide 2.

In the description above, it was described that the optical waveguide 2 has the reflective surface 2d, and the first irradiation light L1 is reflected by the reflective surface 2d and is emitted to the exterior of the optical waveguide 2, but the present disclosure is not limited to this. The optical waveguide 2 may also emit the first irradiation light L1 transmitted in the optical waveguide 2 to the right side in FIG. 1 without having the reflective surface 2d.

In the description above, it was described that the first measured light L2 is completely reflected by the reflective surface 2d in the optical waveguide 2, but the present disclosure is not limited to this. For example, the reflective surface 2d may not fulfill the condition of completely reflecting. When doing so, a reflective film such as metal that can reflect the first measured light L2 may be joined to the reflective surface 2d of the optical waveguide 2.

In the description above, it was described that the control unit 80 determines whether a threshold value is reached, but the present disclosure is not limited to this. For example, the user may make such a determination while checking the absorption spectrum of the attached material output from the output unit 70. Furthermore, if the optical waveguide 2 has sufficient resistance to the first irradiation light L1, the control unit 80 may control the first irradiation unit 10 so that the first irradiation light L1 is always irradiated at a second irradiation intensity.

In the above description, it was described that the metal thin film 3 includes a thin film of gold, silver, copper, aluminum, and the like, but the present disclosure is not limited to this. For example, the spectroscopic analysis device 1 may have any film that generates surface plasmon.

In the description above, it was described that the respective wavelength bands of the first irradiation light L1 and the first measured light L2 are included in the ultraviolet region, but the present disclosure is not limited to this. These wavelength bands may be included in another wavelength band. For example, these wavelength bands may be included in the visible region.

In the description above, the respective wavelength bands of the second irradiation light L3 and the second measured light L4 are included in the near infrared region, but the present disclosure is not limited to this. These wavelength bands may be included in another wavelength band. For example, these wavelength bands may be included in the mid-infrared range or visible range.

1 Spectroscopic analysis device
2 Optical waveguide
2b, 2d Reflective surface
2a, 2c Front surface
3 Metal thin film (film)
4 Prism
5 Filter
10 First irradiation unit
20 First detection unit
30 Second irradiation unit
31 Wideband light source
32 Light guide component
33 Light parallelization component
40 Second detection unit
41 Light condensing component
42 Light guide component
43 Detection unit
50 Storage unit
60 Input unit
70 Output unit
80 Control unit
L1 First irradiation light
L2 First measured light
L3 Second irradiation light
L4 Second measured light
S Sample
$\theta 1$, $\theta 2$ Angle

What is claimed is:

1. A spectroscopic analysis device, comprising:
   a film that contacts a sample subject to spectroscopic analysis;
   a first irradiator that irradiates a first irradiation light having transition energy to decompose attached material attached to a boundary surface of the film; and
   an optical waveguide that transmits the first irradiation light irradiated from the first irradiator, wherein
   a first evanescent wave, based on the first irradiation light, is generated on a front surface of the optical waveguide, and is then projected on an attached region of the attached material,
   the spectroscopic analysis device further comprises:
   a second irradiator that irradiates a second irradiation light on the film, wherein the second irradiation light generates a second evanescent wave that projects onto a region of the sample;
   a detector that detects a measured light based on the second irradiation light irradiated by the second irradiator, wherein the second measured light comprises information of an absorption spectrum of the sample;
a prism that allows the second irradiation light and the measured light to pass through; and
a filter disposed between the prism and the optical waveguide, wherein the filter has higher transmissivity with respect to the second irradiation light than transmissivity with respect to the first irradiation light.

2. The spectroscopic analysis device according to claim 1, wherein
the optical waveguide comprises a reflective surface that completely reflects the first irradiation light incident on the optical waveguide, and
the first irradiation light incident on the optical waveguide is transmitted while being completely reflected by the reflective surface in the optical waveguide.

3. The spectroscopic analysis device according to claim 1, further comprising:
an additional detector that detects an additional measured light emitted from the optical waveguide, wherein
the additional measured light is based on the first irradiation light irradiated by the first irradiator, and
the additional measured light comprises information of an absorption spectrum of the attached material.

4. The spectroscopic analysis device according to claim 3, further comprising:
a controller that:
obtains, from the additional detector, the information of the absorption spectrum of the attached material,
determines, based on the obtained information, whether a peak of the absorption spectrum has reached a threshold value relating to spectrum intensity, and
when it is determined that the threshold value has been reached, changes irradiation intensity of the first irradiation light using the first irradiator.

5. The spectroscopic analysis device according to claim 4, wherein the controller increases the irradiation intensity of the first irradiation light using the first irradiator when it is determined that the peak of the absorption spectrum increases and reaches the threshold value.

6. The spectroscopic analysis device according to claim 3, wherein a wavelength band of the first irradiation light and a wavelength band of the additional measured light are included in the ultraviolet range.

7. The spectroscopic analysis device according to claim 1, wherein a wavelength band of the second irradiation light and a wavelength band of the measured light are included in the near infrared range.

8. A spectroscopic analysis device, comprising:
a film that contacts a sample subject to spectroscopic analysis;
an optical waveguide that transmits a first irradiation light having transition energy to decompose attached material attached to a boundary surface of the film, wherein a first evanescent wave, based on the first irradiation light, is generated on a front surface of the optical waveguide, and is then projected on an attached region of the attached material;
an irradiator that irradiates a second irradiation light on the film, wherein the second irradiation light generates a second evanescent wave that projects onto a region of the sample;
a detector that detects a measured light based on the second irradiation light irradiated by the second irradiator, wherein the measured light comprises information of an absorption spectrum of the sample;
a prism, which allows the second irradiation light and the measured light to pass through, disposed on a side opposite the film with respect to the optical waveguide; and
a filter disposed between the prism and the optical waveguide, wherein the filter has higher transmissivity with respect to the second irradiation light than transmissivity with respect to the first irradiation light.

9. A method, comprising:
irradiating, with a first irradiator, a first irradiation light having transition energy to decompose attached material attached to a boundary surface of a film, wherein the film contacts a sample subject to spectroscopic analysis;
transmitting, to an optical waveguide, the irradiated first irradiation light;
generating a first evanescent wave on a front surface of the optical waveguide, wherein the first evanescent wave is based on the first irradiation light;
projecting the first evanescent on an attached region of the attached material;
irradiating, with a second irradiator, a second irradiation light on the film, wherein the second irradiation light generates a second evanescent wave that projects onto a region of the sample;
detecting a measured light based on the second irradiation light, wherein the measured light comprises information of an absorption spectrum of the sample; and
passing the second irradiation light and the measured light through a prism, wherein
a filter, which has higher transmissivity with respect to the second irradiation light than transmissivity with respect to the first irradiation light, is disposed between the prism and the optical waveguide.

* * * * *